United States Patent [19]
Russell

[11] Patent Number: 6,062,645
[45] Date of Patent: May 16, 2000

[54] HEADREST SUPPORT ASSEMBLY

[75] Inventor: Martin E. Russell, Hendersonville, Tenn.

[73] Assignee: Del-Met Corporation, Nashville, Tenn.

[21] Appl. No.: 09/211,601

[22] Filed: Dec. 14, 1998

[51] Int. Cl.[7] .............................. A47C 7/38; B60N 2/48
[52] U.S. Cl. .............................................................. 297/410
[58] Field of Search .................................... 297/391, 410; 403/348, 349

[56] References Cited

U.S. PATENT DOCUMENTS

| | | |
|---|---|---|
| 4,577,904 | 3/1986 | Wiese . |
| 4,604,777 | 8/1986 | Meeks ................................. 297/410 X |
| 5,397,170 | 3/1995 | Shrock ................................. 297/391 X |
| 5,445,434 | 8/1995 | Kehurt ..................................... 297/391 |
| 5,507,585 | 4/1996 | Diederich et al. ..................... 403/349 |
| 5,529,379 | 6/1996 | Stocker . |
| 5,597,260 | 1/1997 | Peterson .............................. 403/348 X |
| 5,667,276 | 9/1997 | Connelly . |
| 5,713,636 | 2/1998 | De Filippo ............................. 297/410 |
| 5,816,658 | 10/1998 | Wallis ................................. 297/391 X |
| 5,860,703 | 1/1999 | Courtois et al. ........................ 297/410 |

*Primary Examiner*—Peter R. Brown
*Attorney, Agent, or Firm*—Natter & Natter

[57] ABSTRACT

A seat back headrest support includes a socket having an axial bore which receives a rod of a headrest frame. An enlarged head is formed at one end of the socket with a spring biased latch carrier mounted to the head. A latch pin, rotatably mounted to the carrier, is urged radially against the rod. The pin engages the rod to maintain the headrest in an adjusted heigth position. A cap having a peripheral skirt covers the head and the latch carrier while an opening in the skirt permits access to the latch carrier for manual release of the pin from engagement with the rod.

20 Claims, 6 Drawing Sheets

| Fig. 1a |
|---|
| Fig. 1b |

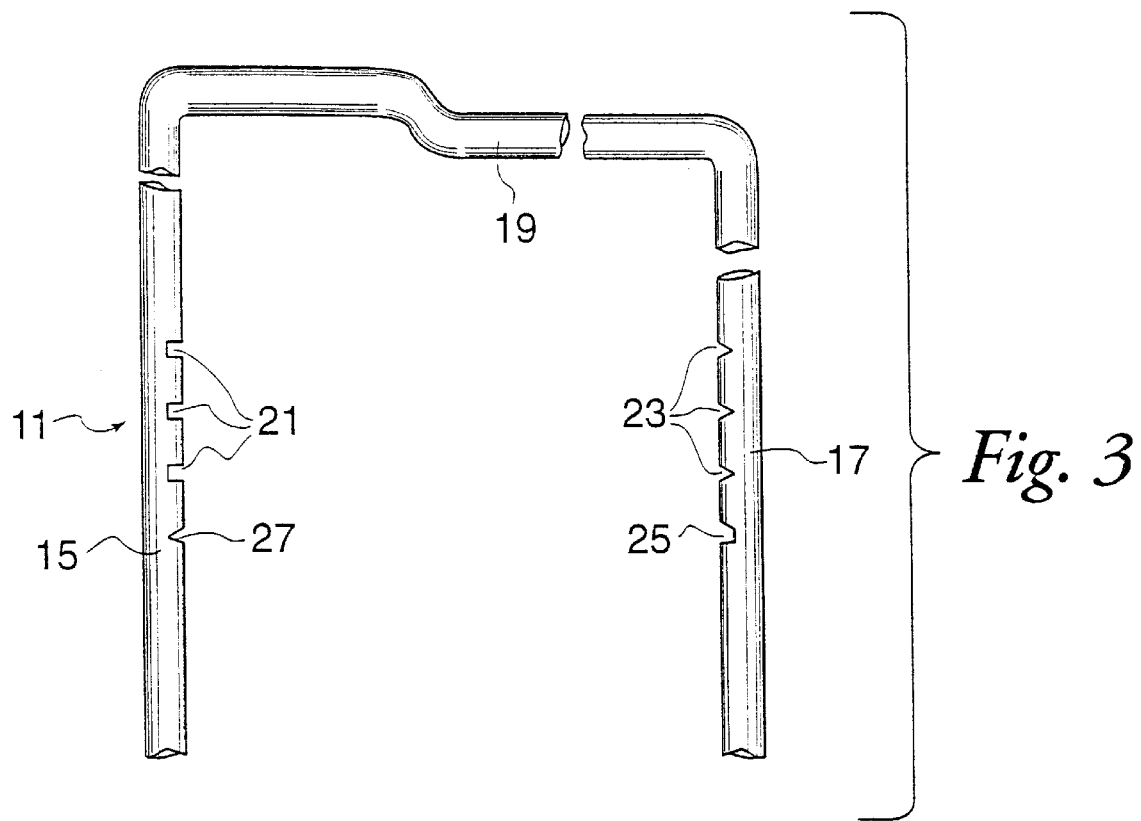
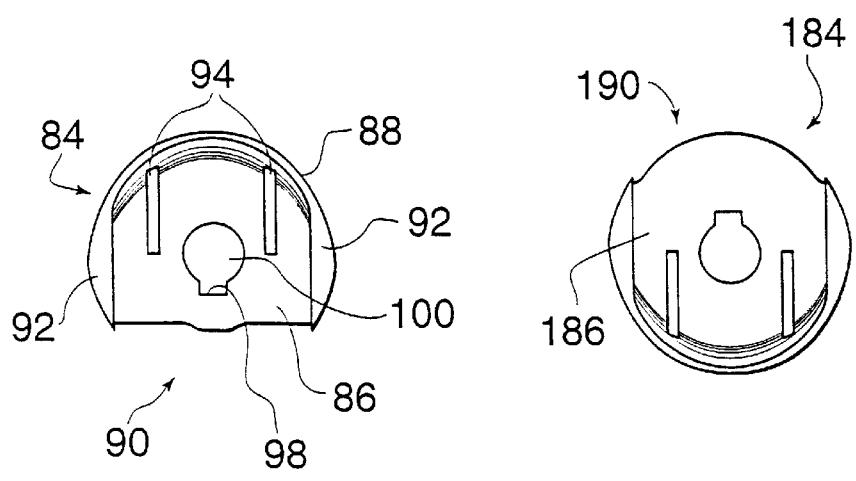
Fig. 3
Fig. 9    Fig. 10

HEADREST SUPPORT ASSEMBLY

BACKGROUND OF THE INVENTION

1. Field of the Invention

This invention relates generally to adjustable headrests and more particularly to a headrest support having a latch pin in rolling engagement against a headrest frame rod.

2. Background History

Seat back headrests have been mandatory equipment in automotive vehicles for a number of years. The requirement was promulgated after a determination had been made that such equipment was efficacious in preventing and/or reducing whiplash injuries.

While compliance with this requirement has been achieved through the utilization of high back seats with an integrated headrest, high back seats have predominantly been employed in vehicles other than passenger cars, such as sport utility vehicles, mini-vans, sports cars, etc. A major drawback encountered with high back seats in passenger vehicles was that they limited rear vision and were not adjustable.

The requirement for headrests in automotive vehicles has primarily been met through the utilization of adjustable headrests which were mounted to project from the top of a seat back. Headrests comprised a suitable soft, yet firm upholstery base pillow of foam or other material covered with fabric, leather, vinyl, etc., matching that of the seat itself. A metal frame of generally inverted "U" shape extended through the headrest. The frame included two parallel rods which extended downwardly from the headrest and through the top of the seat back. Each rod was received in the bore of a socket which was mounted in the seat back, with the socket having an enlarged head flush with the top of the seat back.

In order to maintain the headrest in an adjusted heighth position, the periphery of the rods included spaced detents and the socket included a spring latch, which was biased against the rod and which engaged the various detents.

The spring latch engaged the detents and the headrest could not be adjusted or removed without manually releasing the latch.

Examples of prior sockets with spring latches are illustrated in the patents to CONNELLY et al. U.S. Pat. No. (5,667,276), STÖCKER U.S. Pat. No. (5,529,379) and WIESE et al. U.S. Pat. No. (4,577,904).

A major drawback with the prior headrest sockets was that the headrest rod was in direct contact with the spring latch during adjustment. The latches were generally formed of relatively hard spring steel and repeated sliding engagement between the latch and the rod had a tendency to wear the plating or other finish from the rod.

With prior socket assemblies, the removal of a complete headrest was a relatively simple task. With the headrest removed, there was, of course, an increased risk of vehicle occupants sustaining severe whiplash injuries.

There was a need for a headrest support wherein the procedure for removal of the headrest was not apparent except to service personnel with knowledge of such procedure or others authorized or having access to a shop or service manual from which such knowledge could be obtained.

SUMMARY OF THE INVENTION

A headrest support assembly includes a socket having an axial bore and an enlarged head at its upper end. A spring biased latch carrier is mounted to the socket head for movement transverse to the axis of the bore. A latch pin, seated in the carrier, is urged against a left headrest frame rod, seated in the bore, in selective engagement with notches formed in the rod to maintain the headrest in an adjusted heighth position. The latch pin is mounted for rotation relative to the latch carrier and relative to the rod.

A cap with a peripheral skirt covers the socket head and the latch carrier while an opening in the cap permits access to a button surface of the carrier for manual release of the latch pin from each notch.

A right headrest frame rod includes detents registered with the notches of the left rod. The latch pin is urged into locking engagement with a notch formed in the right rod at the uppermost heighth of the headrest to prevent unauthorized removal of the headrest. A security cap and security latch carrier is employed with the socket receiving the right rod. The security cap includes a cut away portion only on its skirt and the security latch carrier does not include a readily visible button surface for release of the latch pin.

For mounting within the seat back, each socket passes through registered openings of a pair of parallel flanges of a headrest bracket. At least one of the openings includes keyway notches, with the socket having corresponding radial flukes. After seating the socket in the bracket, the socket is rotated so that the flukes are not registered with the keyways. The socket is locked in the rotated position by a spring tab which engages one of the keyways.

From the foregoing, compendium, it will be appreciated that it is an aspect of the present invention to provide a headrest support assembly of the general character described which is not subject to the disadvantages of the background history aforementioned.

It is a feature of the present invention to provide a headrest support assembly of the general character described which is relatively low in cost and suitable for economical mass production fabrication.

A consideration of the present invention is to provide a headrest support assembly of the general character described with reduced wear on headrest frame rods.

A further feature of the present invention is to provide a headrest support assembly of the general character described which prevents removal of vehicle seat back headrests, except by authorized personnel.

Another aspect of the present invention is to provide a headrest support assembly of the general character described which seat is well suited for implementation in mass production vehicle assembly lines.

Another consideration of the present invention is to provide a headrest support assembly of the general character described with rolling, rather than sliding engagement between a spring latch and a rod of a headrest frame.

A still further aspect of the present invention is to provide a headrest support assembly of the general character described which provides for simplified headrest heighth adjustments by a vehicle operator while at the same time precluding headrest removal except by authorized personnel.

Another aspect of the present invention is to provide a headrest support assembly of the general character described which may be easily installed in a vehicle seat back by relatively unskilled personnel.

Yet another feature of the present invention is to provide a headrest support assembly of the general character described which may be fabricated by molding of relatively low cost lightweight thermoplastics.

Other aspects, features and considerations in part will be obvious and in part will be pointed out hereinafter.

With these ends in view, the invention finds embodiment in certain combinations of elements arrangements and parts and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various exemplary embodiments of the invention:

FIG. 3 is a reduced scale fragmentary front elevational view of the headrest frame and showing a left rod with inwardly facing heighth adjusting notches and a right rod with registered inwardly facing detents;

FIG. 9 is a bottom view of a cap which covers the left socket;

FIG. 10 is a bottom view of a security cap which covers the right socks; and

DESCRIPTION OF THE PREFERRED EMBODIMENTS

Figures 1A, 2:
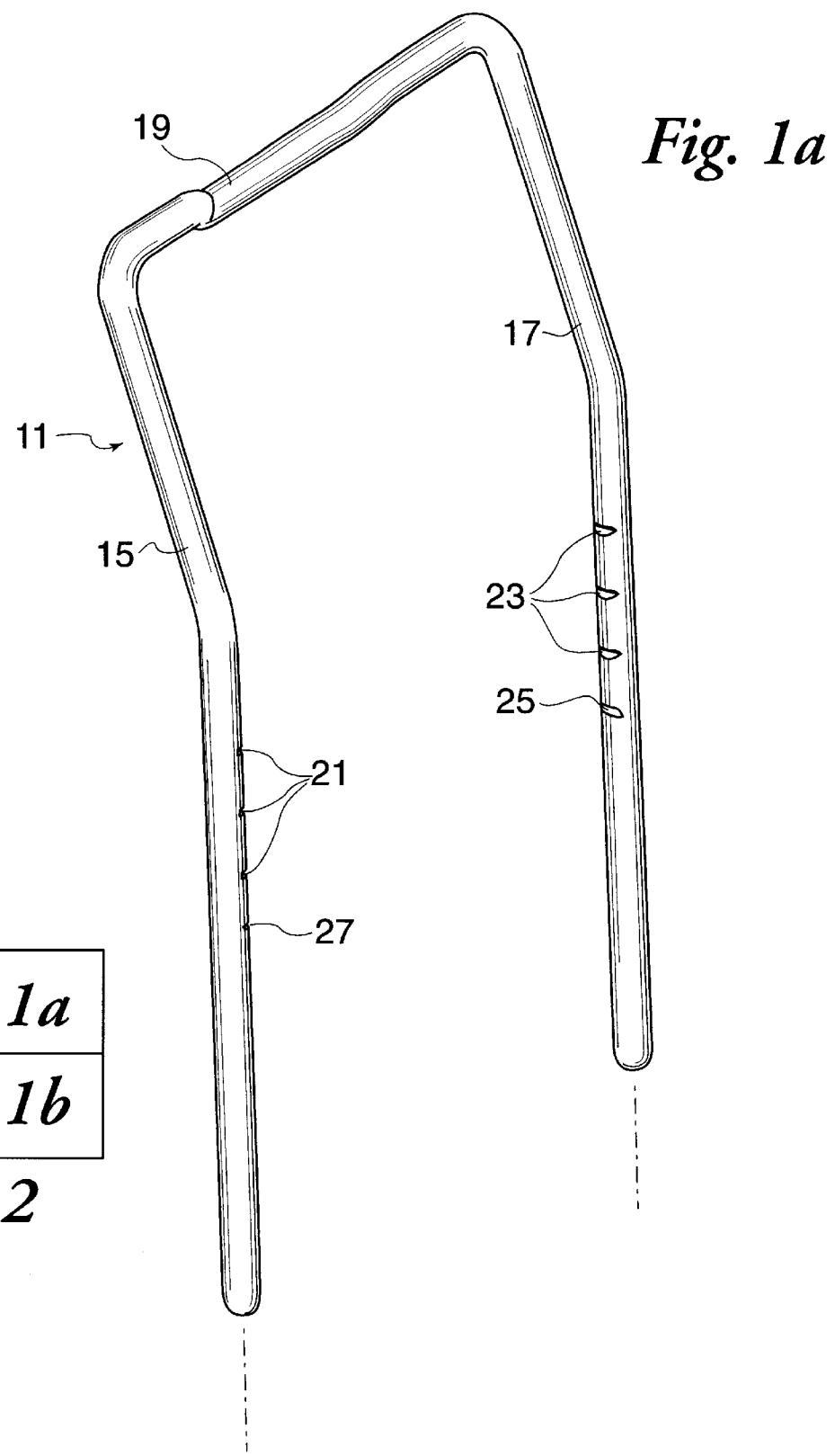
FIG. 1a is a perspective exploded view of a headrest frame having a pair of parallel vertical rods which are received within a headrest support assembly constructed in accordance with and embodying the invention.
FIG. 2 is a diagram showing the orientation of FIG. 1a and FIG. 1b for exploded view continuity.

Referring now in detail to the drawings, the reference numeral 10 denotes generally a headrest support assembly constructed in accordance with and embodying the invention. The support assembly 10 is adapted to receive and adjustably mount a one piece headrest frame 11 which comprises a substantially cylindrical left rod 15 and a parallel, substantially cylindrical right rod 17. A unitary top rail 19 joins the rods 15, 17.

The top rail 19 and adjacent portions of the rods 15, 17 support a cushioned vehicle headrest (not shown). As will be more readily seen in FIG. 3, the left rod 15 includes, on its inwardly facing surface, a plurality of evenly spaced heighth adjustment notches 21. Each of the notches 21 comprises a cutout area of the rod 15 having substantially planar top and bottom surfaces which are perpendicular to the axis of the rod 15.

A plurality of detents 23 are provided on the corresponding inwardly facing surface of the right rod 17. The notches 21 of the rod 15 and the detents 23 of the rod 17 are registered with one another.

It will be noted that the detents 23 comprise cutout portions of the rod 17 wherein the upper and lower surfaces are sloped, i.e. lie in the planes acute to the axis of the rod 17.

The rod 17 also includes a lowermost inwardly facing notch 25 having a planar lower face which is perpendicular to the axis of the rod 17 and a sloped upper face. Corresponding to the notch 25 in the rod 17 is a detent 27, formed in the rod 15, with the upper and lower surfaces of the detent 27 being sloped, in a manner similar to the detents 23 of the rod 17.

The support assembly 10 comprises a left and a right (as viewed in FIG. 1b) socket 12, 14 which are identical in configuration. Each socket includes an elongate cylindrical stem 16 having an axial bore 18 for receiving one of the rods 15, 17 and an enlarged head 20 having a generally flat platform 22 extending in a plane transverse to the axis of the bore.

The sockets 12, 14 are preferably molded in one piece of a suitable lightweight thermoplastic and are adapted to be seated and locked in engagement with a mounting bracket 24, which is fixed within a vehicle seat back (not shown). The bracket 24 includes an upper and a lower flange 26, 28, each of which includes a left and a right (as viewed in FIG. 1b) opening 30, 32. The openings 30, 32 of the upper flange 26 are keyed with large and small radial cutouts 31, 33 and the stem 16 of each socket includes correspondingly sized large and small radial flukes 34, 36. Optionally, the openings 30, 32 of the lower flange 28 include radial cutouts and the stems include lower flukes, as shown. A further alternative is to provide the cutouts in the openings 30, 32 of only the lower flange 28.

Figure 1B:
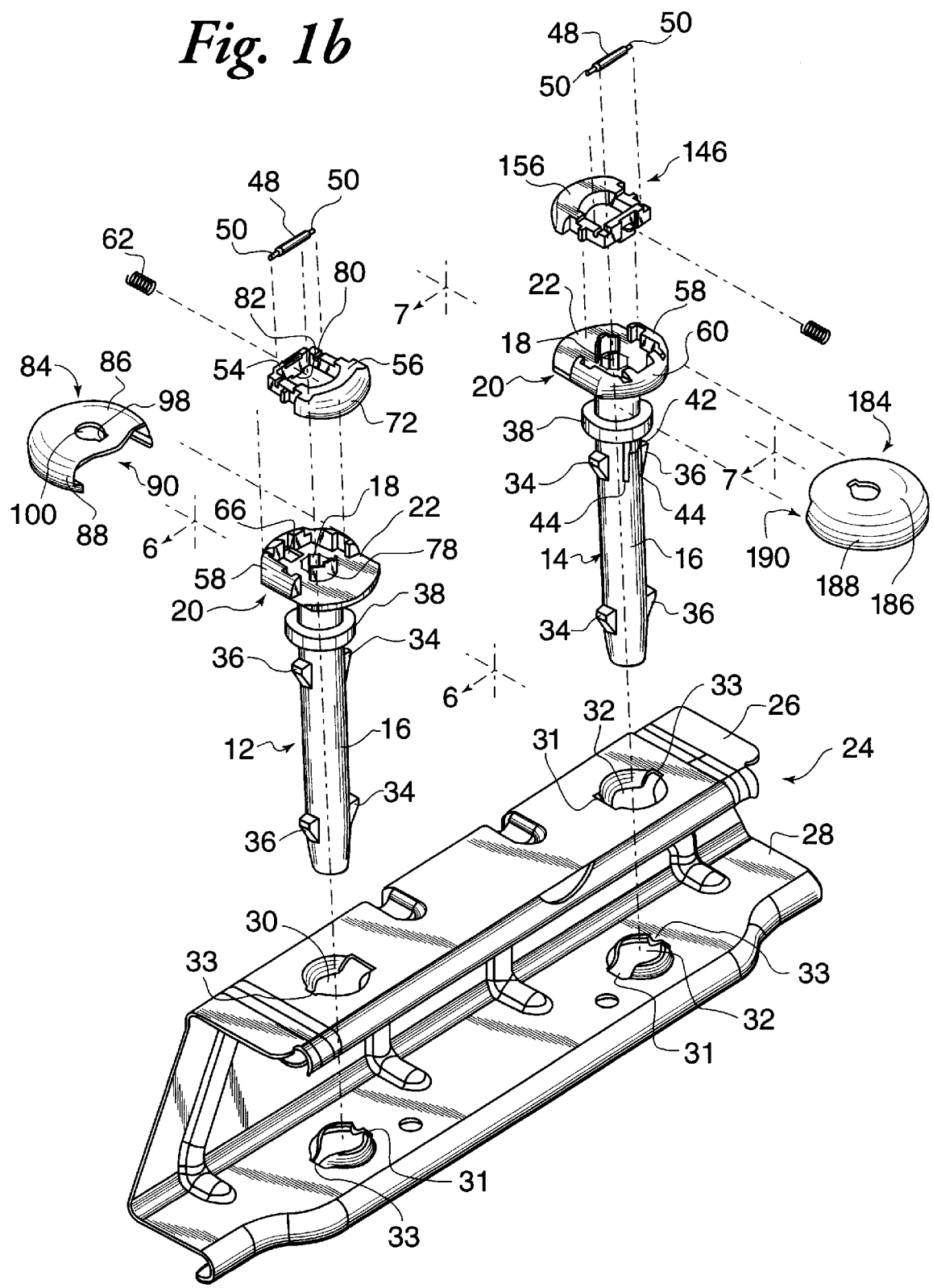
FIG. 1b is a continuation of the exploded view of FIG. 1a and showing a pair of sockets for receiving the rods and a mounting bracket carried within a seat back for receiving the sockets.

When the sockets 12, 14 are inserted through their respective bracket openings 30, 32, they are oriented 180° with respect to one another, as illustrated in FIG. 3 and in the exploded view of FIG. 1b.

Figure 4:
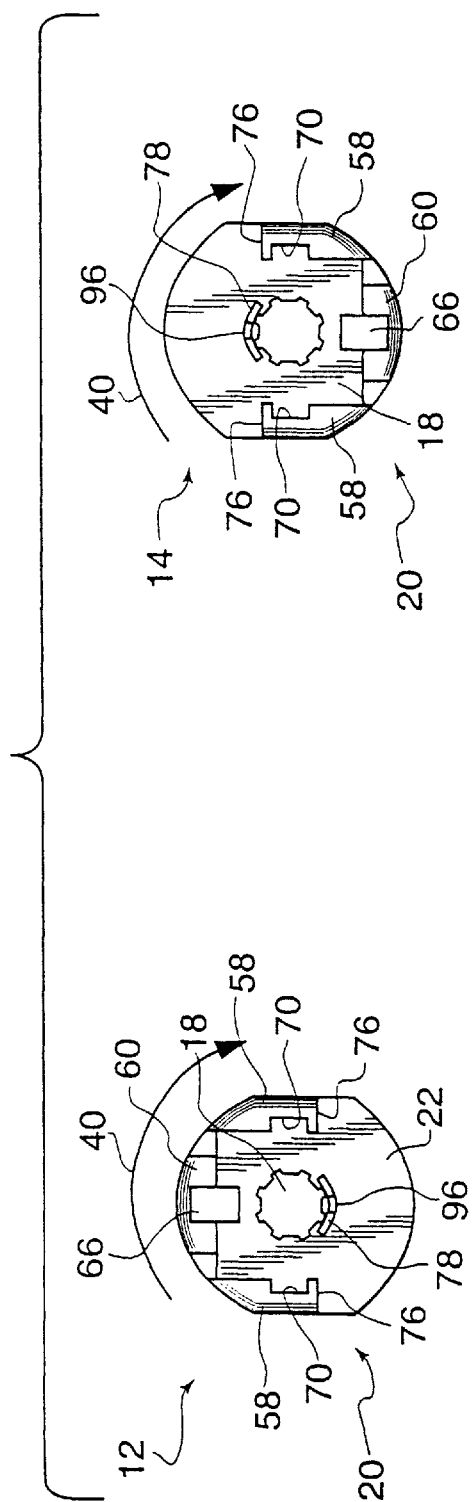
FIG. 4 is a top plan view of the sockets and illustrating the direction of rotation of the sockets after they have been seated in the bracket in order to lock the sockets in operative position.
Figure 5:
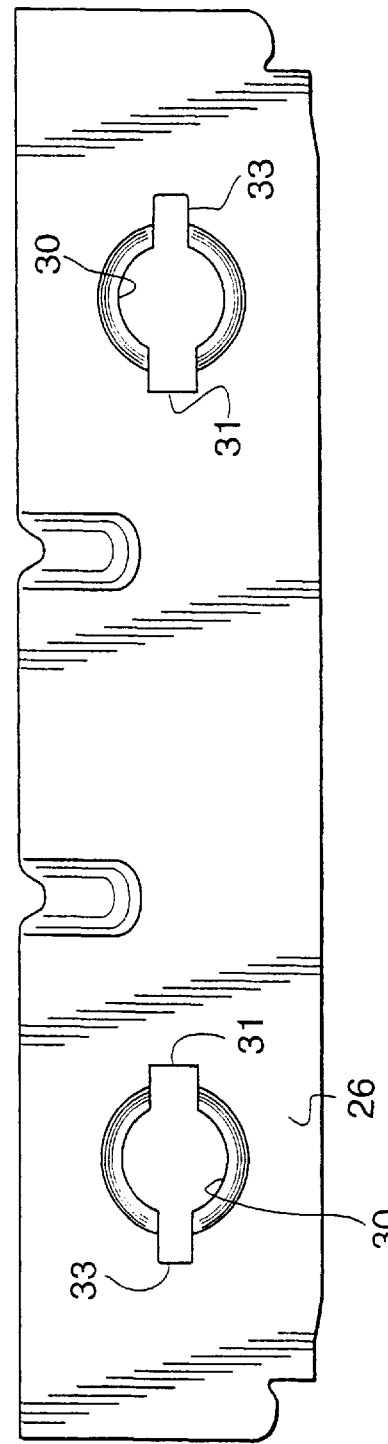
FIG. 5 is a corresponding top plan view of the mounting bracket.

An annular flange 38 on each stem 16 serves as an abutment stop, engaging the flange 26 when the stems are fully seated and the flukes 34, 36 are beneath the flanges 26, 28. Thereafter, each of the sockets 12, 14 is rotated in a clockwise direction, as illustrated by the arrows 40 in FIG. 4, such that the flukes 34, 36 are oriented at 90° with respect to the cutouts 31, 33.

Figures 6, 7:
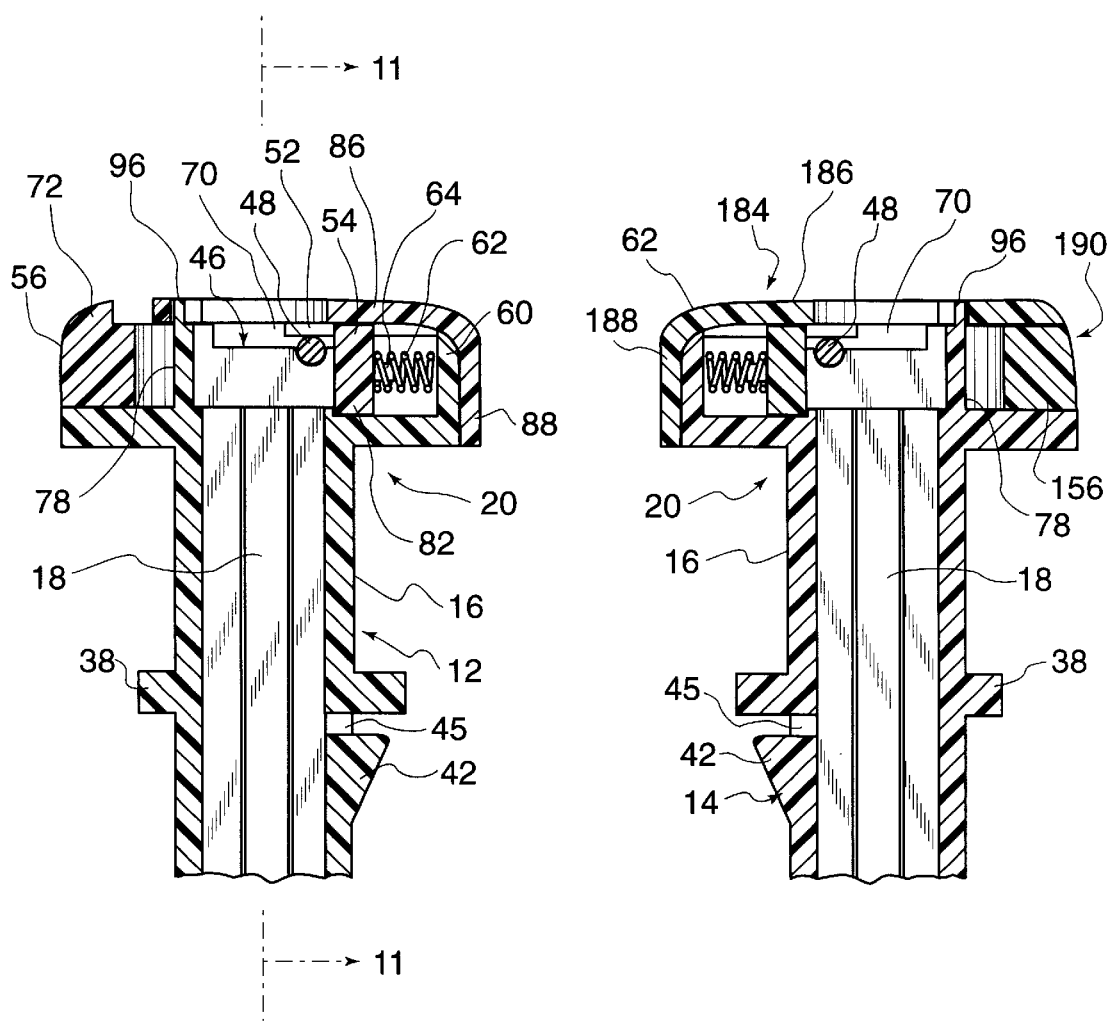
FIG. 6 is an enlarged scale fragmentary sectional view through an assembled left socket, with the rod omitted, the same being taken substantially along the plane 6—6 of FIG. 1b.
FIG. 7 is an enlarged scale fragmentary sectional view of an assembled right socket, with the rod omitted, the same being taken substantially along the plane 7—7 of FIG. 1b.

Each of the stems 16 includes a cantilevered locking tab 42 which is defined by a pair of longitudinal slits 44 in the wall of the stem into the bore and a transverse upper slit 45 (FIG. 6). Upon insertion of the stems into the openings 30, 32, of the upper flange 26, each tab 42 is deflected radially inwardly. When each of the sockets is rotated 90° from the insertion position, each tab 42 becomes registered with a large cutout 31 in the upper flange 26 and springs outwardly to seat in the cutout, thus locking the socket against further rotation. If the cutouts are only in the lower flange, the tab 42 is positioned between the lower flukes.

Figure 8:
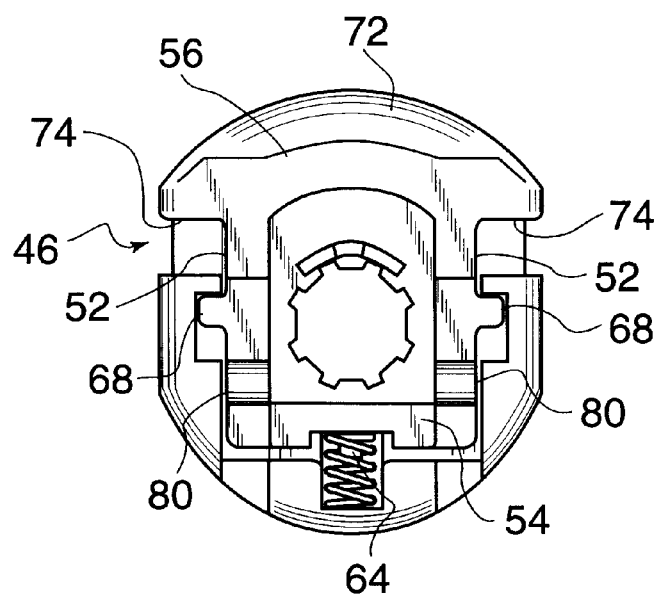
FIG. 8 is a top plan view of a latch carrier for the left socket.

With reference to the left socket 12, it will be seen from an examination of FIG. 1b, that mounted to the head 20 is a latch carrier 46 which accommodates a latch pin 48 having a pair of axial journals 50 extending from each end. As illustrated in FIG. 8, the latch carrier 46 is formed of one piece and includes a pair of parallel legs, 52, joined at one end by a substantially perpendicular rear wall 54. The legs 52 are joined, at their opposite ends, by an arcuate bail 56 with the bottom surface of the carrier 46 being substantially planar and lying upon the flat platform 22.

The head 20 includes a pair of substantially parallel side walls 58 which project upwardly from the platform and which are joined by an upwardly projecting rear wall 60.

The latch carrier 46 is biased to a normal position, spaced from the rear wall 60, by a helical coil spring 62 which is mounted over a post 64, projecting from the rear wall 54. The spring 62 is seated in a notched portion of the rear wall 60 and within a shallow depression 66 of the platform 22.

Movement of the latch carrier 46 is constrained by engagement between a pair of flanges 68, which extend laterally from the legs 52, and a pair of registered recesses 70, formed in the side walls 58 of the head 20.

It should also be noted that the latch carrier bail 56 includes a raised release button 72. The release button 72 extends to a height greater than the remainder of the carrier. The bail 56 includes a pair of transverse lateral shoulders 74 which are configured to abut against a forward end 76 of each of the sidewalls 58 to provide a stop for limiting movement of the latch carrier 46 when the button 72 is moved toward the rear wall 60.

An integral apron wall 78 projects upwardly from the platform 22 forwardly of the bore 18 and serves as an auxiliary stop for limiting movement of the latch carrier 46 toward the rear wall by engagement against an arcuate inner surface of the bail 56.

In accordance with the invention, the journals 50 of the latch pin 48 are cradled within arcuate troughs 80, formed in the latch carrier legs 52, so that the latch pin 48 is free to rotate relative to the latch carrier.

With reference now to FIG. 8, it should be noted that the spring 62 urges the latch carrier 46 to a normal position wherein the button 72 is substantially flush with the corresponding front surface of the platform 22. Such position is maintained by engagement between the lateral flanges 68 and the corresponding ends of the recesses 70. Additionally, an auxiliary limit stop is provided by engagement between a depending tongue 82 of the latch carrier rear wall 54 and the forward end of the platform depression 66.

A cap 84 is mounted to the head 20 of the left socket 12. The cap 84 includes a substantially circular canopy 86 and a depending skirt 88. A forward portion 90 of the cap 84 across the skirt 88 is removed to provide an open passageway for sliding assembly of the cap over the head including the side walls 58, the rear wall 60 and the latch carrier 46, and a portion of the canopy 86 is removed to provide access to the button 72.

Figure 11:
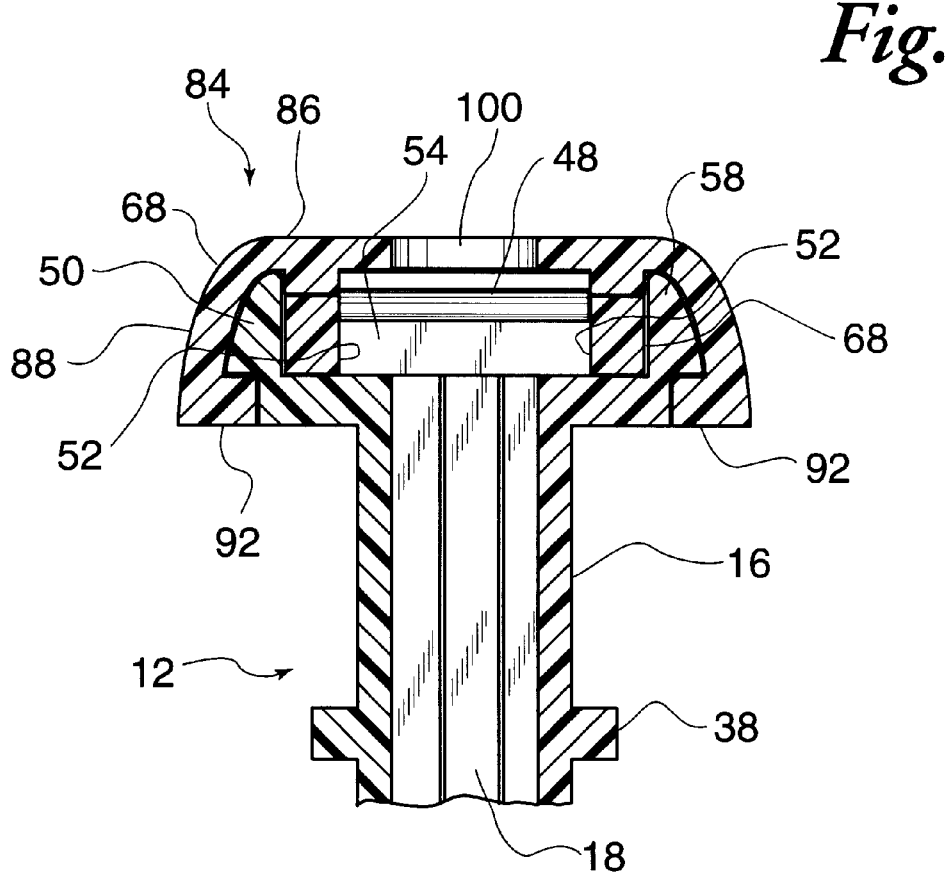
FIG. 11 is a reduced scale sectional view through an assembled left socket, the same being taken substantially along the line 11—11 of FIG. 6.

Diametrically opposed lower surfaces of the skirt 88 include an inturned lower lip 92 as shown in FIG. 9, with the lips having parallel edges for engagement in corresponding parallel grooves on the underside of the platform 22, as illustrated in FIG. 11.

The undersurface of the canopy 86 also includes depending parallel ribs 94 which extend forwardly. To permit the cap to be slid over the head, the rear wall 60 of the head 20 includes registered grooves to accommodate the ribs 94. When the cap is mounted to the head, as illustrated in FIG. 6, the ribs 94 serve as upper limit stops to prevent disengagement of the latch pin journals 50 from their troughs 80.

From an examination of FIG. 1b and FIG. 6 it will be observed that a locking tab 96, projecting from the top of the apron wall 78, snaps into a cut out 98 formed in the canopy 86. The cut out 98 extends radially from a central rod receiving aperture 100 of the canopy. With the cap in assembled position, the aperture 100 is coaxial with the bore 18. The top of the button 72 is flush with the top of the canopy 86, however a cut-away portion of the bail 56 provides clearance for inward movement of the carrier 46.

An examination of FIG. 6 reveals that in the normal position of the latch carrier 46, the latch pin 48 extends over and into the bore 18. With the rod 15 seated in the left socket 12, the latch pin 48 will be urged into engagement within one of the notches 21. Since the top and bottom surfaces of each notch 21 are substantially perpendicular to the axis of the rod 15, the rod 15 cannot be moved axially to change the heighth of the headrest unless the latch pin 48 is disengaged by pushing the button 72 toward the rod. The latch pin 48 will be in rolling engagement with the rod 17 as the headrest height is adjusted and will automatically snap into the next successive notch 21.

With respect to the right socket 14, a security latch carrier 146, which is substantially of the same configuration as the latch carrier 46, is provided. However, a bail 156 of the latch carrier 146 does not include a raised button and is substantially flush, to be received entirely underneath a canopy 186 of a security cap 184. The security cap 184 is substantially identical to the cap 84 previously described however, the canopy 186 covers and conceals the entire head 20 of the right socket 14, leaving only a concealed opening 190 in a peripheral skirt 188 for accessing the bail 156.

The right socket carries a latch pin 48 and is biased by a coil spring 62 to urge the latch pin against the inner surface of the right rod 17. The latch pin will automatically seat in and disengage from the adjustment detents 23 of the rod 17, due to the sloped upper and lower surfaces of the detents. Thus only the button 72 of the latch carrier 46 need be actuated for headrest heighth adjustments.

When the headrest frame 11 is put in its uppermost adjusted position, the latch pin 48 of the security carrier 146 will seat within the notch 25 and will lock in such position against further upward movement and removal of the headrest unless the latch pin 48 of the security carrier 146 is withdrawn from the notch 25.

The bail 156 of the security carrier 146 may be accessed by a finger of a service technician through the concealed opening 190 in the skirt to slide the carrier 146 radially inwardly. It should be appreciated, however, that the bail 156 is not readily visible, since the skirt surface of the cap 186 and the surface of bail 156, exposed through the concealed opening 190, are matingly contoured and, in addition, have the same surface texture and color.

With the security carrier 146 manually moved to release the pin 48 from engagement with the notch 25, the headrest frame 11 may be lifted completely out of the seat back. The sloped lower surface of the detent 27 in the rod 15 will automatically disengage the pin 48 of the left socket 12 without the necessity of engaging the button 72.

The upper surface of the notch 25 is not perpendicular to the axis of the rod 17, but is sloped so that the latch pin 48 automatically disengages from the notch 25 to permit the headrest to be lowered.

Thus, it will be seen that there is provided a headrest support assembly which achieves the various aspects, features and considerations of the present invention and which is well suited to meet the conditions of practical usage.

Since various possible embodiments might be made of the present invention and since various changes might be made of the exemplary embodiment shown, it is to be understood that all matter herein described or shown in the accompanying drawings is to be interpreted as illustrative and not in a limiting sense.

Having thus described the invention there is claimed as new and desired to be secured by Letters Patent:

1. A headrest support assembly, the headrest support assembly comprising a socket, the socket including a bore having an axis, a headrest frame, the frame having a rod, the rod being positioned in the bore, the socket further including a latch pin, a spring biasing the latch pin against the rod, the latch pin being mounted for rotation relative to the socket about an axis transverse to the axis of the bore, the latch pin being in rolling engagement with the rod upon axial movement of the rod within the bore.

2. A headrest support assembly as constructed in accordance with claim 1, the assembly further including a latch carrier, the latch pin being rotatable relative to the carrier, the spring engaging the carrier for biasing the latch pin against the rod.

3. A headrest support assembly as constructed in accordance with claim 2 wherein the carrier includes a pair of legs, the legs being substantially parallel to one another and being positioned on diametrically opposed sides of the bore, the pin including journals, the journals being seated in the legs.

4. A headrest support assembly as constructed in accordance with claim 2 wherein the socket includes a head, the carrier being mounted to the head for reciprocal sliding movement in a direction transverse to the axis of the bore.

5. A headrest support assembly as constructed in accordance with claim 4 wherein the latch pin is manually moved against the bias of the spring from a position wherein the latch pin is in engagement with the rod, to a release position, wherein the latch pin is disengaged from the rod to permit movement of the rod relative to the socket.

6. A headrest support assembly as constructed in accordance with claim 5, the assembly further including a cap, the cap being mounted to the head, the cap being positioned over the carrier and the latch pin, the cap having an access opening for sliding the carrier in a direction transverse to the axis of the bore to the release position.

7. A headrest support assembly as constructed in accordance with claim 6 wherein the carrier includes a button surface for engagement of the carrier to release the latch pin from the rod, the access opening exposing the button surface.

8. A headrest support assembly as constructed in accordance with claim 7 wherein the headrest frame rod includes a plurality of axially spaced notches, each notch defining an adjusted heighth position of the headrest frame, each notch including substantially parallel upper and lower planar surfaces, the planar surfaces being substantially perpendicular to the axis of the rod, the latch pin being in selective engagement with and fixing the rod in an adjusted heighth position when the latch pin is seated in a notch, the carrier being manually moved against the bias of the spring for disengaging the latch pin from the selected notch by engaging the button surface, whereby the position of a headrest may be adjusted.

9. A headrest support assembly constructed in accordance with claim 7 wherein the button surface is elevated.

10. A headrest support assembly as constructed in accordance with claim 6 wherein the access opening is concealed from view, whereby a vehicle headrest mounted to the headrest frame may be removed only by authorized personnel having knowledge of the access opening.

11. A headrest support assembly, as constructed in accordance with claim 10, wherein the rod includes a notch defining the uppermost heighth position of the headrest frame, the notch having a lower planar surface, the lower planar surface being substantially perpendicular to the axis of the rod, the latch pin being in selective engagement with the notch and preventing removal of the rod from the socket, the carrier being engaged to release the latch pin from the rod only by authorized personnel having knowledge of the concealed access opening.

12. A headrest support assembly as constructed in accordance with claim 11, the headrest frame having a second rod, the headrest support assembly including a second socket having a bore, the second socket including a second latch pin, a second spring biasing the second socket latch pin against the second rod, the second latch pin being rotatable relative to the second socket about an axis transverse to the axis of the bore of the second socket, the second latch pin being in rolling engagement with the second rod upon axial movement of the second rod within the bore, a second latch carrier, the second latch pin being rotatable relative to the second carrier and a second spring engaging the second carrier for biasing the second latch pin against the second rod, the second socket including a head, the second carrier being mounted to the second socket head for reciprocal sliding movement in a direction transverse to the axis of the bore of the second socket, the second latch pin being moveable against the bias of the second spring from a position wherein the second latch pin is in engagement with the second rod to a release position; when the second latch pin is disengaged from the second rod, a second cap, the second cap being mounted to the head of the second socket, the second cap being positioned over the second carrier and the second latch pin, the second cap having an access opening, the second carrier including a button surface for engagement of the second carrier to release the second pin from the second rod, the access opening exposing the button surface, the second rod including a plurality of axially spaced notches, each notch defining an adjusted heighth position of the headrest frame, each notch including substantially parallel upper and lower planar surfaces, the planar surfaces being substantially perpendicular to the axis of the second rod, the second latch pin being in selective engagement with and fixing the second rod in an adjusted heighth position when the second latch pin is seated in a selected notch, the second carrier being manually moved against the bias of the spring for disengagement of the second latch pin from the selected notch by engaging the button surface.

13. A headrest support assembly as constructed in accordance with claim 12, wherein the headrest frame rod includes a plurality of axially spaced detents, each detent being registered with one of the axially spaced notches of the second rod, each detent including upper and lower surfaces which are at an angle to the axis of the rod for rolling engagement with the latch pin, whereby the rod may be moved from an engagement position wherein the latch pin is seated in a selected detent by exerting axial force on the rod, without the necessity of manually engaging the carrier.

14. A headrest support assembly as constructed in accordance with claim 4 wherein the headrest frame rod includes a plurality of axially spaced notches, each notch defining an adjusted heighth position of the headrest frame, each notch including substantially parallel upper and lower planar surfaces, the planar surfaces being substantially perpendicular to the axis of the rod, the rod being fixed in an adjusted heighth position when the latch pin is seated in a selected notch, the carrier being manually moved against the bias of the spring for disengaging the latch pin from the selected notch, whereby the position of a headrest may be adjusted.

15. A headrest support assembly as constructed in accordance with claim 1 further including a mounting bracket carried in a seat back, the bracket including a flange, the flange having an opening for receiving the socket therethrough, the opening including at least one radial keyway, the socket having a radially projecting fluke dimensioned to axially pass through the keyway when the socket is inserted through the opening, the socket including a radial tab, the tab being deflected inwardly when the socket passes through the opening, the socket being rotated such that the fluke is no longer registered with the keyway to prevent withdrawal of the socket from the seat back, the tab springing outwardly and entering the keyway to prevent further rotation of the socket when the tab is registered with the keyway.

16. A seat back headrest support assembly, the assembly comprising a socket, the socket having a bore for receiving a headrest frame rod, a mounting bracket carried in a seat back, the bracket including a flange, the flange having an opening for receiving the socket therethrough, the opening including at least one radial keyway, the socket having a radially projecting fluke dimensioned to axially pass through the keyway when the socket is inserted through the opening, the socket including a radial tab, the tab being deflected inwardly when the socket passes through the opening, the socket being rotated such that the fluke is no longer registered with the keyway to prevent withdrawal of the socket from the mounting bracket, the tab springing outwardly and entering the keyway to prevent further rotation of the socket when the tab is registered with the keyway.

17. A seat back headrest support assembly as constructed in accordance with claim 16 wherein the bracket includes a pair of flanges, each flange having an opening for receiving the socket, the openings being registered with one another, the keyway being formed in one of the openings.

18. A method of assembling an automobile seat headrest support socket in an automobile seat back, the seat back having a mounting bracket with at least one opening therein for receiving the socket, the opening having a radial keyway, the socket having a radial fluke and a flexible radial tab, the method including the steps of:

(a) axially registering the socket with the bracket opening;

(b) registering the radial fluke with the keyway;

(c) inserting the socket into the seat back while maintaining the registration of step (a) and (b);

(d) passing the socket into the bracket opening;

(e) passing the fluke through the keyway;

(f) rotating the socket so that the fluke is no longer registered with the keyway;

(g) deflecting the tab radially inwardly when passing the socket into the bracket opening;

(h) maintaining the tab in a deflected position when the socket is rotated; and (i) permitting the tab to move radially outwardly into the keyway when the tab is registered with the keyway;

whereby the socket is prevented from rotating to a position which would permit withdrawal of the socket from the seat back.

19. A method of assembling an automobile seat headrest assembly in an automobile seat back in accordance with claim 18 wherein the socket includes a bore, the method including the further steps of:

(j) providing a headrest having a frame with a depending rod; and (k) inserting the rod into the bore.

20. A headrest support assembly, the headrest support assembly comprising a socket, the socket including a bore having an axis, a headrest frame, the frame having a rod, the rod being positioned in the bore, the socket further including a latch, a latch carrier, the latch comprising a pin mounted to the carrier for rotation relative to the socket about an axis transverse to the axis of the bore, a spring engaging the carrier for biasing the latch against the rod, the socket including a head, the carrier being mounted to the head for reciprocal sliding movement in a direction transverse to the axis of the bore, the assembly further including a cap, the cap being mounted to the head, the cap being positioned over the carrier and the latch, the cap having an access opening for sliding the carrier in a plane transverse to the axis of the bore and in a direction against the bias of the spring to release the latch from engagement with the rod, the access opening being concealed from view, whereby a vehicle headrest mounted to the headrest frame may be removed only by authorized personnel having knowledge of the access opening.

* * * * *